US008567503B2

(12) United States Patent
Welton et al.

(10) Patent No.: US 8,567,503 B2
(45) Date of Patent: Oct. 29, 2013

(54) COMPOSITION AND METHOD RELATING TO THE PREVENTION AND REMEDIATION OF SURFACTANT GEL DAMAGE

(75) Inventors: Thomas D. Welton, Duncan, OK (US); Jason E. Bryant, Duncan, OK (US); David E. McMechan, Duncan, OK (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 11/499,446

(22) Filed: Aug. 4, 2006

(65) Prior Publication Data

US 2008/0035339 A1    Feb. 14, 2008

(51) Int. Cl.
  *E21B 21/00*    (2006.01)
  *E21B 37/00*    (2006.01)
(52) U.S. Cl.
  USPC .......................................... 166/312; 166/305.1
(58) Field of Classification Search
  None
  See application file for complete search history.

(56) References Cited

U.S. PATENT DOCUMENTS

| | | | |
|---|---|---|---|
| 3,333,634 A * | 8/1967 | Townsend et al. ......... 166/270.1 |
| 4,089,787 A | 5/1978 | Lybarger et al. |
| 4,090,563 A | 5/1978 | Lybarger et al. |
| 4,540,448 A | 9/1985 | Gautier et al. |
| 4,595,512 A | 6/1986 | Tellier et al. |
| 4,708,207 A | 11/1987 | Kalfayan et al. |
| 5,335,733 A * | 8/1994 | Sandiford et al. ............ 166/300 |
| 5,481,018 A | 1/1996 | Athey et al. |
| 5,783,524 A | 7/1998 | Greindl et al. |
| 5,786,313 A | 7/1998 | Schneider et al. |
| 5,979,557 A * | 11/1999 | Card et al. ..................... 166/300 |
| 6,436,880 B1 * | 8/2002 | Frenier .......................... 507/244 |
| 6,569,814 B1 | 5/2003 | Brady et al. |
| 6,762,154 B2 * | 7/2004 | Lungwitz et al. ............. 507/131 |
| 6,828,280 B2 * | 12/2004 | England et al. ................ 507/202 |
| 6,881,709 B2 | 4/2005 | Nelson et al. |
| 6,903,054 B2 * | 6/2005 | Fu et al. ......................... 507/244 |
| 6,978,838 B2 * | 12/2005 | Parlar et al. ................... 166/311 |
| 7,036,585 B2 | 5/2006 | Zhou et al. |
| 7,052,901 B2 | 5/2006 | Crews |
| 7,114,567 B2 * | 10/2006 | Chan et al. .................. 166/280.1 |
| 7,159,659 B2 | 1/2007 | Welton et al. |
| 7,261,160 B2 | 8/2007 | Welton et al. |
| 7,299,874 B2 | 11/2007 | Welton et al. |
| 7,303,019 B2 | 12/2007 | Welton et al. |
| 7,655,603 B2 * | 2/2010 | Crews ............................. 507/203 |
| 7,687,439 B2 * | 3/2010 | Jones et al. .................... 507/131 |
| 8,071,511 B2 | 12/2011 | Welton et al. |
| 2002/0070022 A1 | 6/2002 | Chang et al. |
| 2002/0076803 A1 | 6/2002 | Crews |
| 2003/0104950 A1 | 6/2003 | Frenier et al. |
| 2003/0139298 A1 | 7/2003 | Fu et al. |
| 2004/0009880 A1 * | 1/2004 | Fu .................................. 507/200 |
| 2004/0011527 A1 * | 1/2004 | Jones et al. .................... 166/304 |
| 2004/0176478 A1 | 9/2004 | Dahayanake et al. |
| 2004/0177960 A1 * | 9/2004 | Chan et al. .................. 166/280.1 |
| 2004/0254079 A1 * | 12/2004 | Frenier et al. ................. 507/260 |
| 2005/0124525 A1 | 6/2005 | Hartshorne et al. |
| 2005/0209108 A1 | 9/2005 | Fu et al. |
| 2005/0233911 A1 * | 10/2005 | Samuel .......................... 507/238 |
| 2006/0025321 A1 | 2/2006 | Treybig et al. |
| 2006/0041028 A1 | 2/2006 | Crews |
| 2006/0183646 A1 | 8/2006 | Welton et al. |
| 2006/0258541 A1 * | 11/2006 | Crews ............................. 507/203 |
| 2007/0060482 A1 | 3/2007 | Welton et al. |
| 2007/0158067 A1 * | 7/2007 | Xiao et al. ..................... 166/279 |
| 2007/0213233 A1 | 9/2007 | Freeman et al. |
| 2007/0281868 A1 | 12/2007 | Pauls et al. |
| 2008/0035339 A1 | 2/2008 | Welton et al. |
| 2008/0035340 A1 | 2/2008 | Welton et al. |
| 2008/0039347 A1 | 2/2008 | Welton et al. |
| 2008/0190609 A1 | 8/2008 | Robb et al. |
| 2008/0194427 A1 | 8/2008 | Welton et al. |
| 2008/0194428 A1 | 8/2008 | Welton et al. |
| 2008/0194430 A1 | 8/2008 | Welton et al. |
| 2008/0200354 A1 | 8/2008 | Jones et al. |
| 2009/0042748 A1 | 2/2009 | Fuller |
| 2009/0042750 A1 | 2/2009 | Pauls et al. |
| 2009/0192054 A1 | 7/2009 | Frenier et al. |
| 2010/0276152 A1 | 11/2010 | De Wolf et al. |
| 2011/0028358 A1 | 2/2011 | Welton et al. |
| 2011/0214874 A1 | 9/2011 | Dakin et al. |
| 2011/0259592 A1 | 10/2011 | Reyes |
| 2012/0067576 A1 | 3/2012 | Reyes et al. |
| 2012/0097392 A1 | 4/2012 | Reyes et al. |
| 2012/0115759 A1 | 5/2012 | Reyes |
| 2012/0260938 A1 | 10/2012 | Zack et al. |

FOREIGN PATENT DOCUMENTS

| | | |
|---|---|---|
| EP | 0976911 A1 | 2/2000 |
| EP | 1 004 571 A1 | 5/2000 |
| EP | 2 371 923 A1 | 10/2011 |
| WO | WO2009/091652 A2 | 7/2009 |

(Continued)

OTHER PUBLICATIONS

U.S. Appl. No. 11/499,447, Welton, et al., Aug. 4, 2006.
Office Action dated Oct. 16, 2007 for U.S. Appl. No. 11/499,447.
Technical Information Paper # XP-002457846 by Alco Chemical entitled AQUATREAT—Polymers and Microbiocides for Industrial Water Treating, Dec. 17, 1999.
International Search Report and Written Opinon for PCT/GB2007/002990, Aug. 6, 2007.
Office action dated Mar. 25, 2008 from U.S. Appl. No. 11/499,447.
Office Action for U.S. Appl. No. 11/499,447 dated Nov. 17, 2008.

(Continued)

*Primary Examiner* — Angela M. DiTrani
(74) *Attorney, Agent, or Firm* — Robert A. Kent; McDermott Will & Emery LLP

(57) ABSTRACT

Among many things, compositions and methods relating to the prevention and remediation of surfactant gel damage are provided. In one embodiment, the method includes providing a treatment fluid comprising a carrier fluid and at least one component selected from the group consisting of a chelating agent and a scale control agent, and introducing the treatment fluid into a subterranean formation that has been treated with a viscoelastic surfactant fluid.

18 Claims, 2 Drawing Sheets

(56) References Cited

FOREIGN PATENT DOCUMENTS

| WO | WO2009/137399 A2 | 11/2009 |
|---|---|---|
| WO | WO 2012/080296 A1 | 6/2012 |
| WO | WO 2012/080297 A1 | 6/2012 |
| WO | WO 2012/080298 A1 | 6/2012 |
| WO | WO 2012/080299 A1 | 6/2012 |
| WO | WO 2012/080463 A1 | 6/2012 |

OTHER PUBLICATIONS

Office Action for U.S. Appl. No. 11/499,447, dated May 18, 2009.
Office Action for U.S. Appl. No. 11/499,447 dated Jan. 28, 2010.
Office Action for U.S. Appl. No. 11/499,447 dated Jun. 22, 2010.
Office Action for U.S. Appl. No. 11/499,447 dated Dec. 3, 2010.
Gdanski, Kinetics of Tertiary Reaction of HF on Alumino-Silicates; Society of Petroleum Engineers, Inc., International Symposium on Formation Damage Control held in Lafayette, LA, Feb. 1996, SPE 31076.
Shuchart et al., Impoved Success in Acid Stimulations wth a New Organic-HF System; Society of Petroleum Engineers, Inc., European Petroleum Conference held in Milan, Italy, Oct. 1996, SPE 36907.
Office Action for U.S. Appl. No. 11/499,447 dated Mar. 9, 2011.
Office Action for U.S. Appl. No. 11/499,447 dated Apr. 21, 2011.
Abrams et al., "The Development and Application of a High PH Acid Stimulation System for a Deep Mississippi Gas Well," American Institute of Mining, Metallurgical and Petroleum Engineers, Inc., 53rd Annual Fall Technical Conference and Exhibition held in Houston, TX, 1978, SPE 7565.
International Search Report and Written Opinion for PCT/GB2012/000406 dated Jul. 18, 2012.
Lepage et al., "An Environmentally Friendly Stimulation Fluid for High-Temperature Applications," SPE Journal XP009160538, 2011.
International Search Report and Written Opinion for PCT/GB2012/000247 dated Jul. 12, 2012.
International Search Report and Written Opinion for PCT/GB2012/000385 dated Aug. 13, 2012.
International Search Report and Written Opinion for PCT/US2013/021562 dated May 24, 2013.

* cited by examiner

COMPOSITION AND METHOD RELATING TO THE PREVENTION AND REMEDIATION OF SURFACTANT GEL DAMAGE

RELATED APPLICATION

This application is related to U.S. patent application Ser. No. 11/499,447, titled "Composition and Method Relating to the Prevention and Remediation of Surfactant Gel Damage," filed concurrently with this application.

BACKGROUND

The present invention relates generally to treating subterranean formations and, more particularly, to compositions and methods relating to the prevention and remediation of surfactant gel damage.

Viscosified treatment fluids may be used in a variety of subterranean treatments. Such treatments include, but are not limited to, drilling operations, stimulation treatments, and sand control treatments. As used herein, the term "treatment," or "treating," refers to any subterranean operation that uses a fluid in conjunction with a desired function and/or for a desired purpose. The term "treatment," or "treating," does not imply any particular action by the fluid.

An example of one such subterranean treatment is a drilling operation, wherein a treatment fluid (e.g., a drilling fluid) passes down through the inside of the drill string, exits through the drill bit, and returns to the drilling rig through the annulus between the drill string and well bore. The circulating drilling fluid, among other things, lubricates the drill bit, transports drill cuttings to the surface, and balances the formation pressure exerted on the well bore. Drilling fluids typically require sufficient viscosity to suspend drill cuttings. Viscosified treatment fluids also may be used in other operations to transport and remove formation particulates from the well bore or the near well bore region. In some instances, these formation particulates may be generated during the course of drilling, digging, blasting, dredging, tunneling, and the like in the subterranean formation.

A common production stimulation operation that employs a viscosified treatment fluid is hydraulic fracturing. Hydraulic fracturing operations generally involve pumping a treatment fluid (e.g., a fracturing fluid) into a well bore that penetrates a subterranean formation at a sufficient hydraulic pressure to create or enhance one or more cracks, or "fractures," in the subterranean formation. The fracturing fluid may comprise particulates, often referred to as "proppant particulates," that are deposited in the fractures. The proppant particulates function, inter alia, to prevent the fractures from fully closing upon the release of hydraulic pressure, forming conductive channels through which fluids may flow to the well bore. Once at least one fracture is created and the proppant particulates are substantially in place, the viscosity of the fracturing fluid usually is reduced (i.e., "breaking" the fluid), and the fracturing fluid may be recovered from the formation. The term "break" and its derivatives, as used herein, refer to a reduction in the viscosity of a fluid, e.g., by the breaking or reversing of the crosslinks between polymer molecules in the fluid, or breaking chemical bonds of gelling agent polymers in the fluid. No particular mechanism is implied by the term.

Another production stimulation operation that employs a viscosified treatment fluid is an acidizing treatment. In acidizing treatments, subterranean formations comprising acid-soluble components, such as those present in carbonate and sandstone formations, are contacted with a treatment fluid comprising an acid. For example, where hydrochloric acid contacts and reacts with calcium carbonate in a formation, the calcium carbonate is consumed to produce water, carbon dioxide, and calcium chloride. In another example, where hydrochloric acid contacts and reacts with dolomite in a formation, the dolomite is consumed to produce water, carbon dioxide, calcium chloride, and magnesium chloride. After acidization is completed, the water and salts dissolved therein may be recovered by producing them to the surface, e.g., "flowing back" the well, leaving a desirable amount of voids (e.g., wormholes) within the formation, which enhance the formation's permeability and may increase the rate at which hydrocarbons may subsequently be produced from the formation.

Viscosified treatment fluids are also utilized in sand control treatments, such as gravel-packing treatments, wherein a treatment fluid, which is usually viscosified, suspends particulates (commonly referred to as "gravel particulates") for delivery to a desired area in a well bore, e.g., near unconsolidated or weakly consolidated formation zones, to form a gravel pack to enhance sand control. One common type of gravel-packing operation involves placing a sand control screen in the well bore and packing the annulus between the screen and the well bore with the gravel particulates of a specific size designed to prevent the passage of formation sand. The gravel particulates act, inter alia, to prevent the formation particulates from occluding the screen or migrating with the produced hydrocarbons, and the screen acts, inter alia, to prevent the particulates from entering the production tubing. Once the gravel pack is substantially in place, the viscosity of the treatment fluid is often reduced to allow it to be recovered. In some situations, fracturing and gravel-packing treatments are combined into a single treatment (commonly referred to as "frac pack" operations) to provide stimulated production and an annular gravel pack to reduce formation sand production.

In a variety of subterranean operations, it also may be desirable to divert treatment fluids in a subterranean formation because, among other reasons, the treatment fluid may enter portions of a subterranean formation with high permeability preferentially at the expense of portions of the subterranean formation with lesser permeability. For example, in acid stimulation operations, it may be desired to contact less permeable portions of the subterranean formation with a treatment fluid containing an acid so as to achieve the desired stimulation. Certain diverting techniques involve the placement of viscosified fluids in a subterranean formation so as to plug off the high-permeability portions of the formation, thereby diverting subsequently injected fluids to less permeable portions of the formation. In certain techniques, a treatment fluid is placed adjacent to a certain portion of a subterranean formation, and the treatment fluid is viscosified so as to form a gel that, inter alia, temporarily plugs the perforations or natural fractures in that portion of the formation. The term "gel," as used herein, and its derivatives include semi-solid, jelly-like states assumed by some colloidal dispersions. When another treatment fluid encounters the gel, it may be diverted to other portions of the formation.

Maintaining sufficient viscosity in treatment fluids may be important for a number of reasons. Viscosity is desirable in drilling operations since treatment fluids with higher viscosity can, among other things, transport solids, such as drill cuttings, more readily. Maintaining sufficient viscosity is important in fracturing treatments for particulate transport, as well as to create or enhance fracture width. Particulate transport is also important in sand control treatments, such as gravel packing. Maintaining sufficient viscosity may be important to control and/or reduce leak-off into the formation, improve the ability to divert another fluid in the formation, and/or reduce pumping requirements by reducing friction in the well bore. At the same time, while maintaining sufficient viscosity of a treatment fluid often is desirable, it also may be desirable to maintain the viscosity of the treatment fluid in such a way that the viscosity may be reduced at a particular time, inter alia, for subsequent recovery of the fluid from the formation.

To provide the desired viscosity, polymeric gelling agents commonly are added to the treatment fluids. The term "gelling agent" is defined herein to include any substance that is capable of increasing the viscosity of a fluid, for example, by forming a gel. Examples of commonly used polymeric gelling agents include, but are not limited to guar gums and derivatives thereof, cellulose derivatives, biopolymers, and the like. The use of polymeric gelling agents, however, may be problematic. For instance, these polymeric gelling agents may leave an undesirable gel residue in the subterranean formation after use, which may reduce permeability. As a result, costly remedial operations may be required to clean up the fracture face and proppant pack. Foamed treatment fluids and emulsion-based treatment fluids have been employed to minimize residual damage, but increased expense and complexity often have resulted.

To combat perceived problems associated with polymeric gelling agents, some surfactants have been used as gelling agents. It is well understood that, when mixed with a fluid in a concentration above the critical micelle concentration, the molecules (or ions) of surfactants may associate to form micelles. The term "micelle" is defined to include any structure that minimizes the contact between the lyophobic ("solvent-repelling") portion of a surfactant molecule and the solvent, for example, by aggregating the surfactant molecules into structures such as spheres, cylinders, or sheets, wherein the lyophobic portions are on the interior of the aggregate structure and the lyophilic ("solvent-attracting") portions are on the exterior of the structure. These micelles may function, among other purposes, to stabilize emulsions, break emulsions, stabilize a foam, change the wettability of a surface, solubilize certain materials, and/or reduce surface tension. When used as a gelling agent, the molecules (or ions) of the surfactants used associate to form micelles of a certain micellar structure (e.g., rodlike, wormlike, vesicles, etc., which are referred to herein as "viscosifying micelles") that, under certain conditions (e.g., concentration, ionic strength of the fluid, etc.) are capable of, inter alia, imparting increased viscosity to a particular fluid and/or forming a gel. Certain viscosifying micelles may impart increased viscosity to a fluid such that the fluid exhibits viscoelastic behavior (e.g., shear thinning properties) due, at least in part, to the association of the surfactant molecules contained therein. As used herein, the term "viscoelastic surfactant fluid" refers to fluids that exhibit or are capable of exhibiting viscoelastic behavior due, at least in part, to the association of surfactant molecules contained therein to form viscosifying micelles. Moreover, because the viscosifying micelles may be sensitive to hydrocarbons, the viscosity of these viscoelastic surfactant fluids may be reduced after introduction into the subterranean formation without the need for certain types of gel breakers (e.g., oxidizers). The term "breaker" is defined herein to include any substance that is capable of decreasing the viscosity of a fluid. This may allow a substantial portion of the viscoelastic surfactant fluids to be produced back from the formation without the need for expensive remedial treatments. Despite these advantages, especially those of viscoelastic surfactants relative to polymeric gelling agents, experience has shown that viscoelastic surfactants may still result in surfactant gel damage to subterranean formation.

SUMMARY

The present invention relates generally to treating subterranean formations and, more particularly, to compositions and methods relating to the prevention and remediation of surfactant gel damage.

In one embodiment, the present invention provides a method comprising providing a treatment fluid comprising a carrier fluid and at least one component selected from the group consisting of a chelating agent and a scale control agent, and introducing the treatment fluid into a subterranean formation that has been treated with a viscoelastic surfactant fluid.

In another embodiment, the present invention provides a method comprising providing a treatment fluid comprising a carrier fluid and at least one component selected from the group consisting of a chelating agent and a scale control agent, and introducing the treatment fluid into a subterranean formation prior to treating the subterranean formation with a viscoelastic surfactant fluid.

In yet another embodiment, the present invention provides a method comprising providing a treatment fluid comprising a carrier fluid; at least one component selected from the group consisting of a chelating agent and a scale control agent; at least one component selected from the group consisting of an alcohol, a glycol, a pH modifier, a hydrocarbon, a mutual solvent, an oxidizer, a reducer, an enzyme, a transition metal, a combination thereof, and a derivative thereof; and at least one component selected from the group consisting of a nonemulsifier, a demulsifier, a combination thereof, and a derivative thereof; and introducing the treatment fluid into a subterranean formation In still another embodiment, the present invention provides a treatment fluid comprising a carrier fluid; at least one component selected from the group consisting of a chelating agent and a scale control agent; at least one component selected from the group consisting of an alcohol, a glycol, a pH modifier, a hydrocarbon, a mutual solvent, an oxidizer, a reducer, an enzyme, a transition metal, a combination thereof, and a derivative thereof; and at least one component selected from the group consisting of a nonemulsifier, a demulsifier, a combination thereof, and a derivative thereof.

The features and advantages of the present invention will be readily apparent to those skilled in the art. While numerous changes may be made by those skilled in the art, such changes are within the spirit of the invention.

BRIEF DESCRIPTION OF THE DRAWINGS

For a more complete understanding of the present invention and features and advantages thereof, reference is now made to the following description, taken in conjunction with the accompanying drawings, in which.

DESCRIPTION OF PREFERRED EMBODIMENTS

Figure 1:
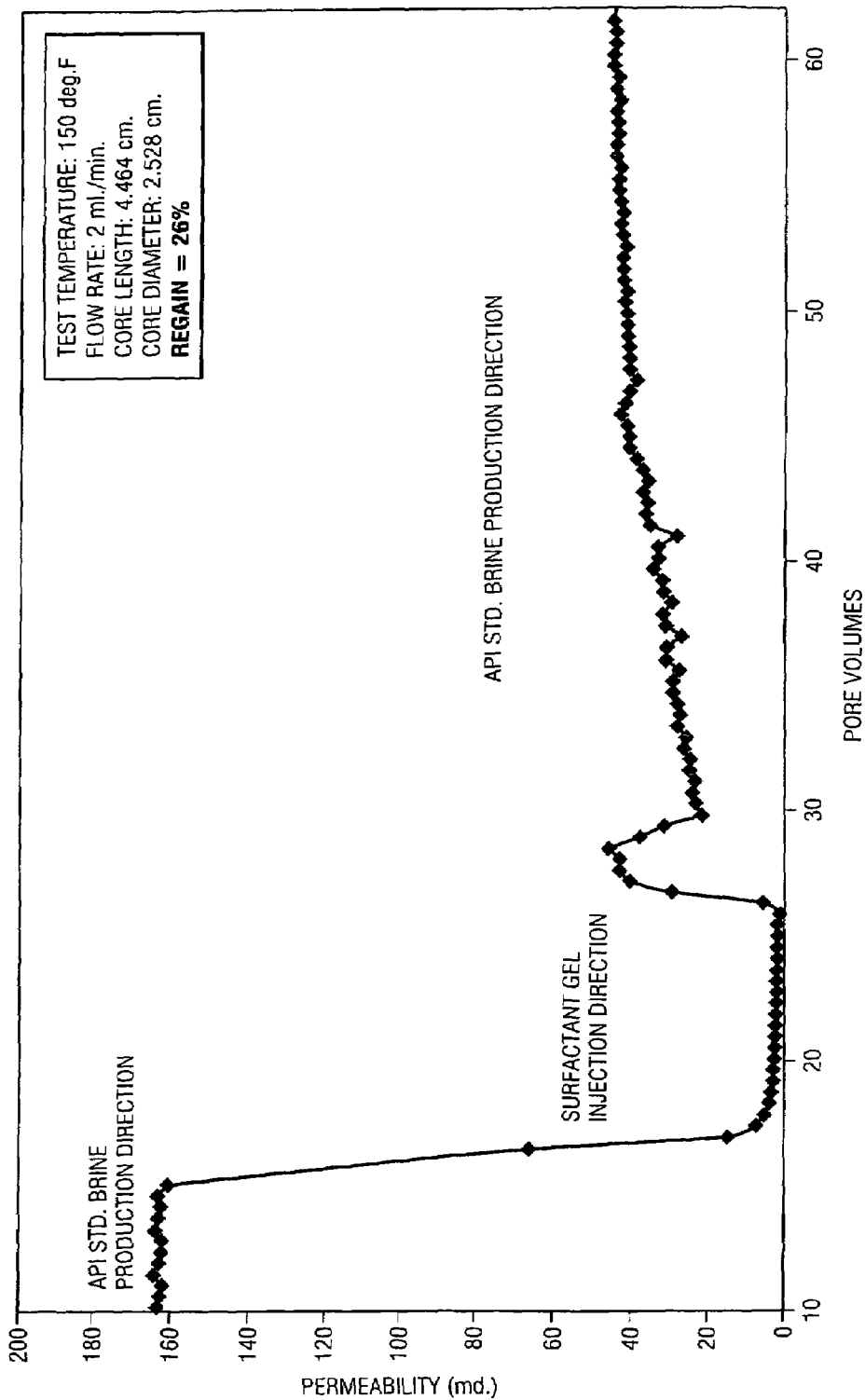
FIG. 1 illustrates the permeability regain of an embodiment of a treatment fluid without a chelating agent.

The present invention relates generally to treating subterranean formations and, more particularly, to compositions and methods relating to the prevention and remediation of surfactant gel damage.

In some embodiments, the compositions and methods of the present invention may be used, among other things, to remediate subterranean formations that have been exposed to viscoelastic surfactant fluids. For example, the compositions of the present invention may be used to treat subterranean formations after a proppant placement, gravel packing operation, frac packing operation, or acidizing operation, or after using a fluid loss pill or "work over" fluid, to remediate any surfactant gel damage that might have occurred during the operation. In other embodiments, the compositions and methods of the present invention may be used to prevent or reduce the occurrence of any possible surfactant gel damage to subterranean formations during treatment with a viscoelastic surfactant fluid. For example, the compositions of the present invention may be used as a prepad fluid prior to the placement of a proppant pack using a viscoelastic surfactant fluid. In other embodiments, the compositions of the present invention may include a viscoelastic surfactant and be used to place the proppant itself. There are many other advantages and objects of this invention that may be realized.

Generally, the treatment fluids of the present invention comprise a carrier fluid and at least one component selected from the group consisting of a chelating agent and a scale control agent. Generally, the carrier fluid of the present invention may comprise any aqueous or non-aqueous fluid. In particular embodiments, the carrier fluid may comprise freshwater, saltwater (e.g., water containing one or more salts dissolved therein), brine (e.g., saturated saltwater), seawater, glycol, combinations thereof, or derivatives thereof. In other embodiments, the carrier fluid may comprise a liquid chelating agent or scale control agent by itself. Generally, the carrier fluid may be from any source, provided that it does not contain components that might adversely affect the stability and/or performance of the treatment fluids of the present invention.

Any suitable chelating agent or scale control agent may be used in accordance with the teachings of the present invention. Examples of suitable chelating agents include ethylenediaminetetraacetic acid ("EDTA"), nitrilotriacetic acid ("NTA"), hydroxyethylethylenediaminetriacetic acid ("HEDTA"), dicarboxymethyl glutamic acid tetrasodium salt ("GLDA"), diethylenetriaminepentaacetic acid ("DTPA"), propylenediaminetetraacetic acid ("PDTA"), ethylenediaminedi(o-hydroxyphenylacetic) acid ("EDDHA"), glucoheptonic acid, gluconic acid, combinations thereof, and derivatives thereof. As used herein, "derivative" refers to any compound that is made from one of the listed compounds, for example, by replacing one atom in the compound with another atom or group of atoms, ionizing the compound, or creating a salt of the compound. "Derivative" also refers to any unneutralized species of any of the listed compounds. Examples of suitable scale control agents include phosphorous compounds, polyaspartic acid, synthetic polymers, polysaccharide polymers, combinations thereof, and derivatives thereof. Examples of suitable phosphorous compounds include amino tri (methylene phosphonic acid), penta sodium salt of aminotri (methylene phosphonic acid), tetra sodium salt of aminotri (methylene phosphonic acid), 1-hydroxyethylidene-1,1,-diphosphonic acid, hexamethylenediaminetetra (methylene phosphonic acid), diethylenetriamine penta(m-ethylene phosphonic acid), bis (hexamethylene triamine penta(methylene phosphonic acid)), 2-phosphonobutane-1,2,4-tricarboxylic acid, monoethanloamine diphosphonate, etidronic acid, combinations thereof, and derivatives thereof including, but not limited to, salts thereof, such as potassium salts of (1-hydroxyethylidene) diphosphonic acid, tetrasodium (1-hydroxyethylidene) biphosphonate, sodium salts of (1-hydroxyethylidene) diphosphonic acid, disodium salts of hydroxyethylidene 1,1-diphosphonic acid, sodium salts of diethylene triamine penta (methylene phosphonic acid), sodium salts of bis hexamethylene triamine penta (methylene phosphonic acid), sodium salts of 2-phosphonobutane-1,2,4-tricarboxylic acid, and tetrasodium etidronate. Examples of suitable commercially available phosphorous compounds include phosphonates sold as part of the Dequest product family available from Solutia, Inc. of St. Louis, Mo. Examples of suitable synthetic polymers include homopolymers of maleic acid, polymers of modified polyacrylic acid, and sulphonated polyacrylic acid copolymers. Examples of commercially available synthetic polymers suitable for use in accordance with the teachings of the present invention include polymers sold as part of the Dequest product family available from Solutia, Inc. of St. Louis, Mo. Examples of suitable polysaccharide polymers include carboxymethyl inulin and salts thereof. In particular embodiments, the chelating agent and/or scale control agent comprises from about 5% to about 60%, by weight, of the treatment fluid. In some particular embodiments, the chelating agent and/or scale control agent may be present in an amount from about 1 to about 100 pounds per gallon of the treatment fluid.

In particular embodiments, the treatment fluids of the present invention may also include one or more alcohols, glycols, pH modifiers, hydrocarbons, mutual solvents, oxidizers, reducers, enzymes (such as those described in U.S. patent application Ser. No. 10/041,528) transition metals (such as those described in U.S. patent application Ser. Nos. 11/145,630, 11/225,536, and 11/225,537), combinations thereof, or derivatives thereof. In such treatment fluids, the alcohols, pH modifiers, hydrocarbons, mutual solvents, oxidizers, reducers, enzymes, and/or transition metals may help break some of the surfactant gels. Examples of suitable alcohols, pH modifiers, hydrocarbons, oxidizers, and/or transition metals include, but are not limited to, iron compounds, zinc compounds, tin compounds, chromium compounds, thioglycolic acid (or salts thereof), erythorbic acid (or salts thereof), stannous chloride, sodium persulfate, potassium persulfate, ammonium persulfate, potassium permanganate, sodium permanganate, sodium periodate, potassium periodate, sodium bromate, ethyleneglycolmonobutylether, propyleneglycolmonobutylether, sodium hydroxide, potassium hydroxide, sodium bicarbonate, potassium carbonate, hydrochloric acid, acetic acid, hydrofluoric acid, formic acid, isopropyl alcohol, butanol, and ethanol. In particular embodiments, the treatment fluids of the present invention may also include organic acids, such as acetic acid, citric acid, lactic acid, combinations thereof, and derivatives thereof.

In particular embodiments, the treatment fluids of the present invention may also include one or more nonemulsifiers, demulsifiers, combinations thereof, or derivatives thereof. In such treatment fluids, the nonemulsifiers or demulsifiers may help remediate emulsion damage caused by surfactant gel/oil interactions. Examples of suitable non-emulsifiers and/or demulsifiers include, but are not limited to, LOSURF™ 259 surfactant, LOSURF™ 300 surfactant, LOSURF™ 357 surfactant, LOSURF™ 400 surfactant, LOSURF™ 2000M surfactant, LOSURF™ 2000S surfactant, and NEA-96M™ surfactant, each of which is commercially available from Halliburton Energy Services, Inc. of Duncan, Okla.

The treatment fluids of the present invention may also include a viscoelastic surfactant. Generally, any suitable surfactant that is capable of imparting viscoelastic properties to an aqueous fluid may be used in accordance with the teachings of the present invention. These surfactants may be cationic, anionic, nonionic, zwitterionic or amphoteric in nature, and comprise any number of different compounds, including methyl ester sulfonates (such as those described in U.S. patent application Ser. Nos. 11/058,660, 11/058,475, 11/058,612, and 11/058,611), betaines, modified betaines, sulfosuccinates, taurates, amine oxides, ethoxylated fatty amines, quaternary ammonium compounds, derivatives thereof, and combinations thereof. When present in the treatment fluids of the present invention, the surfactant is generally present in an amount sufficient to provide the desired viscosity (e.g., sufficient viscosity to divert flow, reduce fluid loss, suspend particulates, etc.) through the formation of viscosifying micelles. In particular embodiments, the surfactant generally comprises from about 0.5% to about 10%, by volume, of the treatment fluid. In particular embodiments, the surfactant comprises from about 1% to about 5%, by volume, of the treatment fluid.

When including a surfactant, the treatment fluids of the present invention may also comprise one or more cosurfactants to, among other things, facilitate the formation of and/or stabilize a foam, facilitate the formation of micelles (e.g., viscosifying micelles), increase salt tolerability, and/or stabilize the treatment fluid. The cosurfactant may comprise any surfactant suitable for use in subterranean environments that does not adversely affect the treatment fluid. Examples of cosurfactants suitable for use in the present invention include, but are not limited to, linear $C_{10}$-$C_{14}$ alkyl benzene sulfonates, branched $C_{10}$-$C_{14}$ alkyl benzene sulfonates, tallow alkyl sulfonates, coconut alkyl glyceryl ether sulfonates, sulfated condensation products of mixed $C_{10}$-$C_{18}$ tallow alcohols with about 1 to about 14 moles of ethylene oxide, and mixtures of higher fatty acids containing about 10 to about 18 carbon atoms. In particular embodiments, the cosurfactant may be present in an amount in the range of from about 0.05% to about 5% by volume of the treatment fluid. In particular embodiments, the cosurfactant may be present in an amount in the range of from about 0.25% to about 0.5% by volume of the treatment fluid. The type and amount of cosurfactant suitable for a particular application of the present invention may depend upon a variety of factors, such as the type of surfactant present in the treatment fluid, the composition of the treatment fluid, the temperature of the treatment fluid, and the like. A person of ordinary skill, with the benefit of this disclosure, will recognize when to include a cosurfactant in a particular application of the present invention, as well as the appropriate type and amount of cosurfactant to include.

The treatment fluids of the present invention may optionally comprise one or more salts to modify the rheological properties (e.g., viscosity) of the treatment fluids. These salts may be organic or inorganic. Examples of suitable organic salts include, but are not limited to, aromatic sulfonates and carboxylates (such as p-toluene sulfonate and napthalene sulfonate), hydroxynapthalene carboxylates, salicylate, phthalate, chlorobenzoic acid, phthalic acid, 5-hydroxy-1-naphthoic acid, 6-hydroxy-1-naphthoic acid, 7-hydroxy-1-naphthoic acid, 1-hydroxy-2-naphthoic acid, 3-hydroxy-2-naphthoic acid, 5-hydroxy-2-naphthoic acid, 7-hydroxy-2-naphthoic acid, 1,3-dihydroxy-2-naphthoic acid, 3,4-dichlorobenzoate, trimethylammonium hydrochloride and tetramethylammonium chloride. Examples of suitable inorganic salts include water-soluble potassium, sodium, and ammonium salts (such as potassium chloride and ammonium chloride), calcium chloride, calcium bromide, magnesium chloride, and zinc halide salts. Examples of viscoelastic surfactant fluids comprising salts suitable for use in the present invention are described in U.S. patent application Ser. No. 10/800,478, the relevant disclosure of which is incorporated herein by reference. Any combination of the salts listed above also may be included in the treatment fluids of the present invention. Where included, the one or more salts may be present in an amount in the range of about 0.1% to about 75% by weight of the treatment fluid. In particular embodiments, the one or more salts may be present in an amount in the range of about 0.1% to about 10% by weight of the treatment fluid. The type and amount of salts suitable in a particular application of the present invention may depend upon a variety of factors, such as the type of surfactant present in the treatment fluid, the composition of the treatment fluid, the temperature of the treatment fluid, and the like. A person of ordinary skill, with the benefit of this disclosure, will recognize when to include a salt in a particular application of the present invention, as well as the appropriate type and amount of salt to include.

The treatment fluids of the present invention may also include one or more well-known additives, such as gel stabilizers, fluid loss control additives, particulates, acids, corrosion inhibitors, catalysts, clay stabilizers, biocides, friction reducers, additional surfactants, solubilizers, pH adjusting agents, bridging agents, dispersants, flocculants, foamers, gases, defoamers, $H_2S$ scavengers, $CO_2$ scavengers, oxygen scavengers, scale inhibitors, lubricants, viscosifiers, weighting agents, and the like. Those of ordinary skill in the art, with the benefit of this disclosure, will be able to determine the appropriate type and amount of such additives for a particular application. For example, in some embodiments, it may be desired to foam a treatment fluid of the present invention using a gas, such as air, nitrogen, or carbon dioxide.

Generally, the treatment fluids of the present invention may have any pH that does not adversely affect the subterranean formation into which the fluid is to be introduced and/or the various components of the fluid. For example, in particular embodiments, the treatment fluids of the present invention may have a pH above about 3. The treatment fluids of the present invention may also have a range of densities, depending, inter alia, on the composition of the fluid and whether or not the fluid is foamed. For example, in particular embodiments, the treatment fluids may have a density below about 10 lb/gal.

In some embodiments, the methods of the present invention comprise providing a treatment fluid comprising a carrier fluid and at least one component selected from the group consisting of a chelating agent and a scale control agent, and introducing the treatment fluid into a subterranean formation. In particular embodiments, the treatment fluids also comprise at least one component selected from the group consisting of an alcohol, a glycol, a pH modifier, a hydrocarbon, a mutual solvent, an oxidizer, a reducer, an enzyme, a transition metal, a combination thereof, and a derivative thereof; and at least one component selected from the group consisting of a non-emulsifier, a demulsifier, a combination thereof, and a derivative thereof. In particular embodiments of the present invention, the treatment fluids may be used to remediate a subterranean formation that has been previously treated with a viscoelastic surfactant fluid, such as a fracturing fluid, gravel packing fluid, frac packing fluid, acidizing fluid, fluid loss pill, or "work over fluid." In such embodiments, the treatment fluids of the present invention may help to remediate surfactant gel damage left behind by the viscoelastic surfactant fluid.

In other embodiments, the treatment fluids of the present invention may be used to prevent or reduce the occurrence of surfactant gel damage. In such embodiments, the treatment fluids may be utilized as prepad fluids (e.g., fluids comprising neither a crosslinker nor proppant) or pad fluids (e.g., a crosslinked fluid comprising no proppant) prior to the placement of a proppant pack or gravel pack. The treatment fluids of the present invention may also be utilized in acidizing, matrix acidizing, fracture acidizing, hydraulic fracturing, gravel packing, and frac packing treatments, as well as in fluid loss pills and "work over fluids." In other embodiments, the treatment fluids of the present invention may be used to place a proppant pack or gravel pack. In such embodiments, the treatment typically also comprise a viscoelastic surfactant. The inclusion of the chelating agent or scale control agent may help to prevent or reduce the amount of surfactant gel damage caused by the viscoelastic surfactant. In particular embodiments, the treatment fluids of the present invention may be introduced into a subterranean formation as a foamed, non-foamed, or emulsion-based treatment fluid.

To facilitate a better understanding of the present invention, the following examples of certain aspects of some embodiments are given. In no way should the following examples be read to limit, or define, the entire scope of the invention.

EXAMPLE

Two treatment fluids were prepared each comprising 50 gal/Mgal of an approximately 30% solution of oleamidopropyl betaine, 5 gal/Mgal of an approximately 75% solution of oleic acid, and approximately 15 gal/Mgal of an approximately 25% solution of NaOH having a pH from about 11.5 to about 12.5 in approximately 7% KCl. Approximately 0.5 g/200 ml (approximately 21 lb/Mgal) of EDTA was added to one of the samples. The permeability regain of the two samples was then tested in Berea sandstone at a temperature of 150° F. and a flow rate of 2 ml/min. The results of these tests are shown in FIGS. 1 and 2.

FIG. 1 illustrates the regain permeability of the sample without the EDTA. With a core length of 4.464 cm and a core diameter of 2.528 cm, the non-EDTA sample exhibited a regain of approximately 26%.

Figure 2:
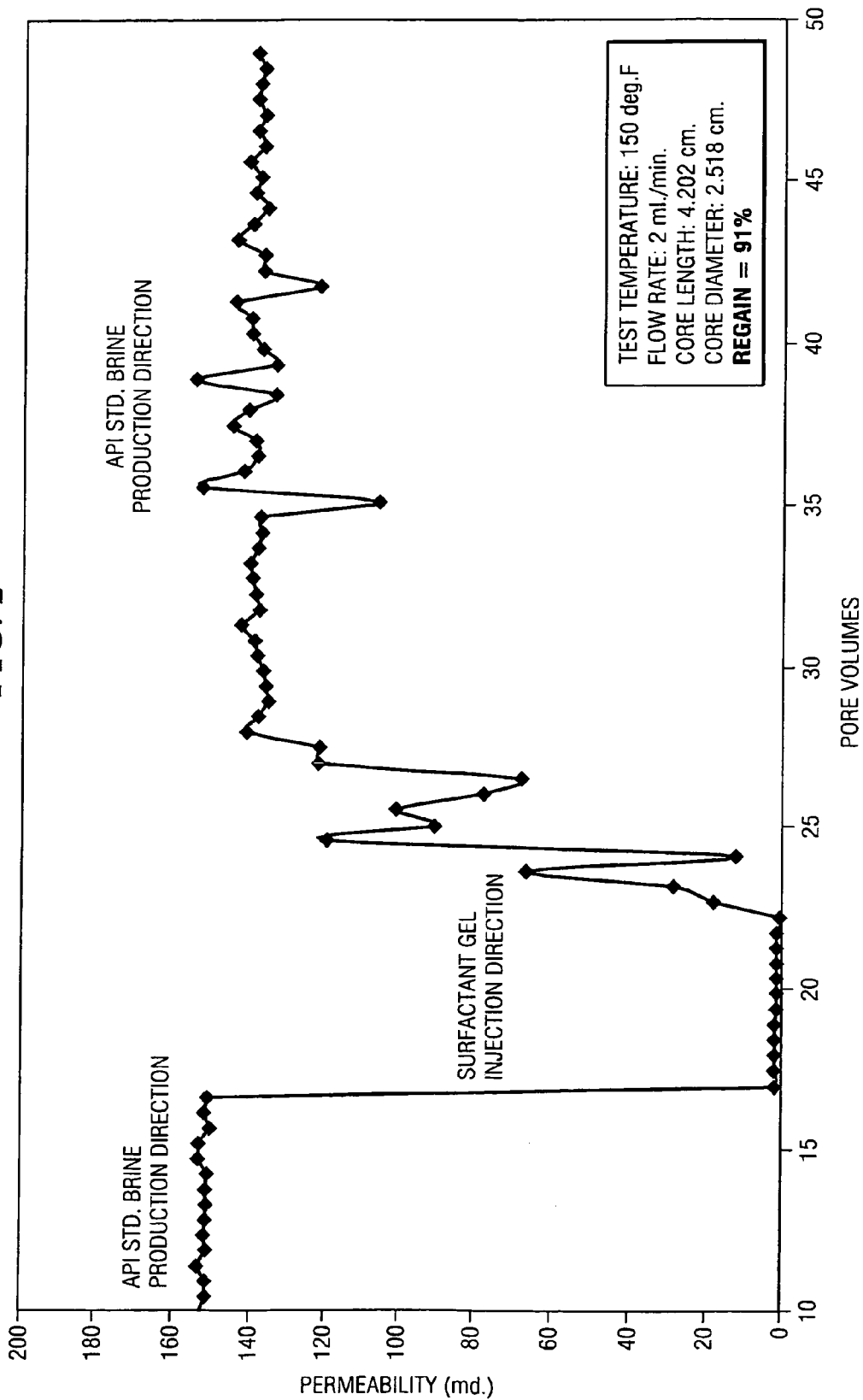
FIG. 2 illustrates the permeability regain of a treatment fluid comprising a chelating agent in accordance with a particular embodiment of the present invention.

FIG. 2 illustrates the regain permeability of the sample containing the EDTA. With a core length of 4.202 cm and a core diameter of 2.518 cm, the EDTA sample exhibited a regain of approximately 91%.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (of the form, "from about a to about b," or, equivalently, "from approximately a to b," or, equivalently, "from approximately a-b") disclosed herein is to be understood as referring to the power set (the set of all subsets) of the respective range of values, and set forth every range encompassed within the broader range of values. Also, the terms in the claims have their plain, ordinary meaning unless otherwise explicitly and clearly defined by the patentee.

What is claimed is:

1. A method of improving permeability regain of a portion of a subterranean formation, the method comprising:
providing a portion of a subterranean formation having a first permeability;
providing a first treatment fluid comprising a carrier fluid, a multivalent chelating agent, and a scale control agent, wherein the multivalent chelating agent comprises at least one chelating agent selected from the group consisting of: nitrilotriacetic acid, dicarboxymethyl glutamic acid tetrasodium salt, diethylenetriaminepentaacetic acid, propylenediaminetetraacetic acid, ethylenediaminedi(o-hydroxyphenylacetic) acid, glucoheptonic acid, a combination thereof, and a derivative thereof and,
wherein the combined weight of the multivalent chelating agent and the scale control agent comprises from about 5% to about 60%, by weight of the first treatment fluid;
introducing the first treatment fluid into the portion of the subterranean formation from a well bore;
then placing a second treatment fluid in the portion of the subterranean formation, the second treatment fluid comprising a viscoelastic surfactant;
treating the subterranean formation with the second treatment fluid in a subterranean operation; and
allowing the component to interact with a surfactant gel damage residue resulting from the second treatment fluid so as to increase the permeability of the subterranean formation to a second permeability, the second permeability being greater than the first permeability and showing a permeability regain of greater than 26%.

2. The method of claim 1, wherein the subterranean operation comprises at least one operation selected from a group consisting of: a drilling operation, a stimulation operation, a sand control operation, an acidizing operation, a matrix acidizing operation, a fracture acidizing operation, a hydraulic fracturing operation, a gravel packing operation, a frac packing operation, and a fluid loss operation.

3. The method of claim 1, wherein the permeability regain is greater than 90%.

4. The method of claim 1, wherein the scale control agent comprises at least one scale control agent selected from the group consisting of: a phosphorus compound, polyaspartic acid, a synthetic polymer, a polysaccharide polymer, a combination thereof, and a derivative thereof.

5. The method of claim 1, wherein the scale control agent comprises at least one scale control agent selected from the group consisting of: amino tri(methylene phosphonic acid), penta sodium salt of aminotri (methylene phosphonic acid), tetra sodium salt of aminotri (methylene phosphonic acid), 1-hydroxyethylidene-1,1,-diphosphonic acid, hexamethylenediaminetetra (methylene phosphonic acid), bis(hexamethylene triamine penta(methylene phosphonic acid)), 2-phosphonobutane-1,2,4-tricarboxylic acid, monoethanolamine diphosphonate, etidronic acid, a salt thereof, a combination thereof, and a derivative thereof.

6. The method of claim 1, wherein the scale control agent comprises at least one scale control agent selected from the group consisting of: a phosphonate compound, a homopolymer of maleic acid, a polymer of modified polyacrylic acid, and a sulphonated polyacrylic acid copolymer, carboxymethyl inulin, and a salt of carboxymethyl inulin.

7. The method of claim 1, wherein the first treatment fluid is foamed.

8. A method of improving regain permeability of a portion of a subterranean formation, the method comprising:
providing a portion of a subterranean formation having a first permeability;
providing a first treatment fluid comprising a carrier fluid, a chelating agent, and a scale control agent;
introducing the first treatment fluid into the portion of the subterranean formation from a well bore;
then placing a second treatment fluid in the portion of the subterranean formation, the second treatment fluid comprising a viscoelastic surfactant;
treating the subterranean formation with the second treatment fluid in a subterranean operation; and
allowing the chelating agent and scale control agent to interact with a surfactant gel damage residue resulting from the second treatment fluid so as to increase the permeability of the subterranean formation to a second permeability, the second permeability being greater than the first permeability and showing a permeability regain of greater than 90%.

9. The method of claim 8, wherein the chelating agent comprises at least one chelating agent selected from the group consisting of: ethylenediaminetetraacetic acid, nitrilotriacetic acid, hydroxyethylethylenediaminetriacetic acid, dicarboxymethyl glutamic acid tetrasodium salt, diethylenetriaminepentaacetic acid, propylenediaminetetraacetic acid, ethylenediaminedi(o-hydroxyphenylacetic) acid, glucoheptonic acid, gluconic acid, a combination thereof, and a derivative thereof.

10. The method of claim 8, wherein the scale control agent comprises at least one scale control agent selected from the group consisting of: a phosphorus compound, polyaspartic acid, a synthetic polymer, a polysaccharide polymer, a combination thereof, and a derivative thereof.

11. The method of claim 8, wherein the scale control agent comprises at least one scale control agent selected from the group consisting of: amino tri(methylene phosphonic acid), penta sodium salt of aminotri (methylene phosphonic acid), tetra sodium salt of aminotri (methylene phosphonic acid), 1-hydroxyethylidene-1,1,-diphosphonic acid, hexamethylenediaminetetra (methylene phosphonic acid), bis(hexamethylene triamine penta(methylene phosphonic acid)), 2-phosphonobutane-1,2,4-tricarboxylic acid, monoethanolamine diphosphonate, etidronic acid, a salt thereof, a combination thereof, and a derivative thereof.

12. The method of claim 8, wherein the scale control agent comprises at least one scale control agent selected from the group consisting of: a phosphonate compound, a homopolymer of maleic acid, a polymer of modified polyacrylic acid, and a sulphonated polyacrylic acid copolymer, carboxymethyl inulin, and a salt of carboxymethyl inulin.

13. A method of preventing occurrence of surfactant gel damage in a portion of a subterranean formation, the method comprising:
providing a first treatment fluid comprising a carrier fluid, a multivalent chelating agent, and a scale control agent,
wherein the chelating agent comprises at least one chelating agent selected from the group consisting of: nitrilotriacetic acid, dicarboxymethyl glutamic acid tetrasodium salt, diethylenetriaminepentaacetic acid, propylenediaminetetraacetic acid, ethylenediaminedi(o-hydroxyphenylacetic) acid, glucoheptonic acid, and a combination thereof, and a derivative thereof and,
wherein the combined weight of the multivalent chelating agent and the scale control agent comprises from about 5% to about 60%, by weight of the first treatment fluid;
introducing the first treatment fluid into the portion of the subterranean formation from a well bore;
then placing a second treatment fluid in the portion of the subterranean formation, the second treatment fluid comprising a viscoelastic surfactant;
treating the subterranean formation with the second treatment fluid in a subterranean operation; and
allowing less surfactant gel damage to form in the portion of the subterranean formation than would have formed without the use of the first treatment fluid prior to use of the second treatment fluid, thereby showing a permeability regain of greater than 26%.

14. The method of claim 13, wherein the operation comprises at least one operation selected from a group consisting of: a drilling operation, a stimulation operation, a sand control operation, an acidizing operation, a matrix acidizing operation, a fracture acidizing operation, a hydraulic fracturing operation, a gravel packing operation, a frac packing operation, and a fluid loss operation.

15. The method of claim 13, wherein the surfactant gel damage is measured in terms of a permeability regain that is greater than 90%.

16. The method of claim 13, wherein the scale control agent comprises at least one scale control agent selected from the group consisting of: a phosphorus compound, polyaspartic acid, a synthetic polymer, a polysaccharide polymer, a combination thereof, and a derivative thereof.

17. The method of claim 13, wherein the scale control agent comprises at least one scale control agent selected from the group consisting of: amino tri(methylene phosphonic acid), penta sodium salt of aminotri (methylene phosphonic acid), tetra sodium salt of aminotri (methylene phosphonic acid), 1-hydroxyethylidene-1,1,-diphosphonic acid, hexamethylenediaminetetra (methylene phosphonic acid), bis(hexamethylene triamine penta(methylene phosphonic acid)), 2-phosphonobutane-1,2,4-tricarboxylic acid, monoethanolamine diphosphonate, etidronic acid, a salt thereof, a combination thereof, and a derivative thereof.

18. The method of claim 13, wherein the scale control agent comprises at least one scale control agent selected from the group consisting of: a phosphonate compound, a homopolymer of maleic acid, a polymer of modified polyacrylic acid, and a sulphonated polyacrylic acid copolymer, carboxymethyl inulin, and a salt of carboxymethyl inulin.

* * * * *